United States Patent [19]

Drabing et al.

[11] 4,361,726

[45] Nov. 30, 1982

[54] THERMAL MESSAGE PRINTER

[75] Inventors: Richard B. Drabing, Los Altos; William S. Duvall, Portola Valley, both of Calif.

[73] Assignee: Amtel Systems Corp., Sunnyvale, Calif.

[21] Appl. No.: 125,846

[22] Filed: Feb. 29, 1980

[51] Int. Cl.[3] ............................................ H04L 15/24

[52] U.S. Cl. .................................................. 178/23 R

[58] Field of Search ............... 178/23 R, 30; 219/216; 101/93.04, 93.05

[56] References Cited

U.S. PATENT DOCUMENTS 3,354,817 11/1967 Sakurai et al. .................... 178/23 R 4,020,465 4/1977 Cochran et al. .................. 178/23 R

*Primary Examiner*—Thomas A. Robinson

*Attorney, Agent, or Firm*—Flehr, Hohbach, Test, Albritton & Herbert

[57] ABSTRACT

A thermal message printer for printing a wide block of text which is produced with low cost printheads. The printer includes a thermal printer having a first number of fixed printheads equal in number to the lines to be printed on thermographic paper. Each of the fixed printheads has a second number of dot elements which are energized in a column fashion according to a pattern of dots to be energized from a matrix of dots for each of the characters. Control means are included for sequentially energizing selected ones of the dot heads in order to form the series of characters such that a wide block of text is printed.

8 Claims, 11 Drawing Figures

THERMAL MESSAGE PRINTER

CROSS REFERENCE TO RELATED APPLICATIONS

"Message Communication System", Ser. No. 125,844, filed Feb. 29, 1980 and assigned to the same assignee as the present invention.

BACKGROUND OF THE INVENTION

The present invention relates to a thermal message printer.

In the prior art, solid state thermal printers have been developed for use as readout/printing devices in a wide variety of applications. A thermal printer offers the benefits of solid hard copy printout without the use of ribbons, inks or odorous chemicals. The thermal printer has the additional advantages of high speed output, small size, high reliability and low power requirement. One family of such devices is manufactured and sold by Texas Instruments, and includes such models as the EPN3100, EPN3112 and EPN3300.

A disadvantage of such thermal line printers is the fact that they are designed to print a certain number of characters per line (typically 12 or 16 characters per line). In a system such as described in more detail in the cross-referenced application entitled "Message Communication System", the capability of displaying only 12–16 characters per line is an undesirable limitation. It would be more advantageous to provide an improved thermal message printer that could provide display of a message without limitations as to the number of characters printed per line.

In view of the above background, it is an objective of the present invention to provide an improved thermal message printer.

SUMMARY OF THE INVENTION

The message printer is typically utilized in a message communication system such as described in the cross-referenced application entitled "Message Communication System". That system provides the capability of an instant printed display in an office complex of who is calling or who has called right at a user's desk. It also provides an electronic mail capability, enabling memoranda to be sent to individuals or to distribution lists.

In order to provide display of messages in such a system, a thermal message printer is utilized which provides the capability of printing a large number of characters per line.

In one embodiment of the present invention, the message printer includes thermal printer means for printing a message where each message is represented by a series of characters, each of the characters being formed by a pattern of dots energized from a matrix of dots. The thermal printer means include a first number of fixed printheads equal to the number of lines to be printed.

Each of the fixed printheads includes a second number of dot elements equal to the number of rows in the matrix. The dot elements are typically connected in common.

Microprocessor means are included for sequentially energizing selected ones of the dot elements for each of the fixed heads thereby forming the series of characters representing a message where each of the characters includes a third number of dot columns equal to the number of columns in the matrix.

In accordance with the above summary, the present invention achieves the objective of providing a thermal message printer.

Other objects and features of the present invention will become apparent from the following detailed description when taken in conjunction with the accompanying drawings.

SYSTEM OVERVIEW

In order to illustrate the operation of the message communication system, a system overview will be described in conjunction with the block diagram depicted in FIG. 1.

The system provides the capability for message entry, transmission, magnetic recording (filing) and subsequent retrieval.

The message communication system provides an instant printed display of who is calling or who has called right at a user's desk. It also provides an electronic mail capability, enabling memoranda to be sent to individuals or to distribution lists.

Another feature is the automated dispatching of daily reminders. This "calendar" capability provides advance notification of important dates by individual, including meetings, due dates for reports or documents, court calendar, anniversaries and the like, whether for a single occasion or periodic events.

Figure 1:
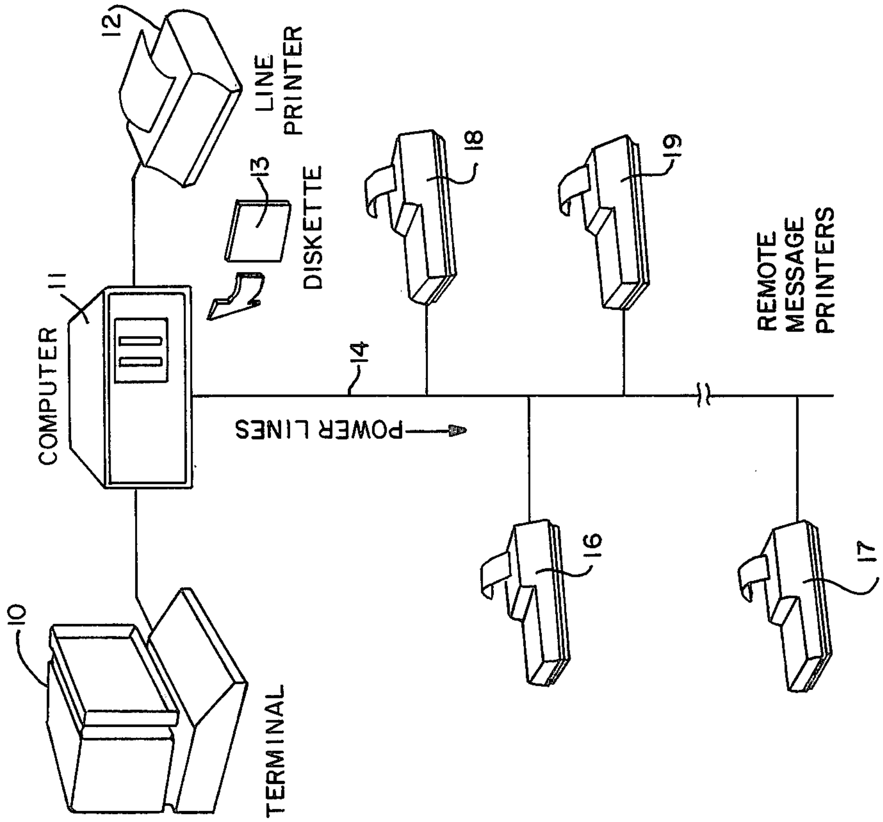
FIG. 1 depicts a block diagram of a message communication system.

Referring to FIG. 1, the central elements of the system are a keyboard and video display terminal 10 which communicates with a compact computer and disk drive 11, which typically is North Star Horizon. A magnetic diskette 13 stores the directory of users and files all of the messages sent, arranged by user. Each message can automatically be posted with time of day, date and sequence number. Messages are sent over a transmission medium such as office power lines 14 to remote message printers 16–19 which are typically located in a user's office.

A central line printer 12 supplies permanent printed file records that tabulate all messages by user. These records provide history files for future access.

When a telephone call cannot be completed, messages are entered at the terminal 10 by a telephone operator or message attendant. Computer 11 automatically formats message forms and stores the text on diskette 13. Messages are transmitted to outlying printers 16–19 as necessary and can be recalled for display or resending at any time.

Each printer depicted in FIG. 1 can be designed to mount under a telephone and each has one or more unique addresses and can be plugged in anywhere in the office complex. The address is pre-assigned to the user and provides him with a private channel of communication for his messages.

In FIG. 1, the message system provides a printing communication service within an organization. Telephone calls that are not completed can be handled by a central attendant who transmits the caller's message to the printer on the desk of the person called. Such messages are also stored in diskette memory 13 for later retrieval. Memory 13 could be any conventional type of storage device, such as a random access memory (RAM), bubble memory or hard disk.

Printers can be assigned to one person or small groups with lower individual traffic.

Standard message forms can be utilized by terminal 10 which is merely filled in by the attendant. A single stroke of a key causes a standard message such as "Please call," "Urgent" or "Returned your call" to be transmitted. All formats are automatically created by computer 11 under software control. Users can be addressed by formal names, nicknames, initials and the like. All messages are given time of day and date, and a sequence number is also assigned by person. This sequencing prevents a missed message.

Messages or memoranda can be sent to individuals or distribution lists of individuals with a single entry into a form. Status of individuals (e.g., "In Plant 7" or "Out until 3:00 p.m.") is automatically displayed to the attendant.

The system is capable of automatic prompting. Not only does the system present formats for filling in, but if a newly trained operator forgets how to perform a particular action, such as adding a new person to the directory or retrieving a previously sent message, instructions are automatically displayed by striking the question mark key on terminal 10, so that substitute personnel can operate the system with little instruction.

All messages sent can also be stored on diskette 13. They can be retrieved by the attendant at any time, providing the function of long term answering service and history file. Messages can be retransmitted singly or in groups to any location in the building. They can be retrieved at any time in the future by inserting an "archive" diskette.

A capability for automatic calendar-related reminders is incorporated in the system. Messages pertaining to important dates such as report due dates, court dates, anniversaries, periodic meetings and the like are sent at prescribed intervals before the date. For example, they can be sent only once or automatically on dates representing a prescribed frequency, such as weekly, monthly, quarterly and the like.

Line printer 12 provides an option for making a permanent printed file copy of all messages received, during any specific period organized by the addressee.

If a user is out of the office, he can call in and have his message file read to him by the attendant, who views them on the screen of terminal 10 as with an answering service. Printed copies are on his desk upon the user's return.

When a user is going to be in another office for a meeting, he can have his messages forwarded to that office on a temporary basis. They are printed in both locations and routing automatically rescinded after a fixed period.

The system can send an announcement or memorandum to specific groups of addressed user printers or to all users as organized by distribution lists, with a single entry.

Visitor messages can be accommodated by the system in the same fashion as permanent users. The visitor is assigned a printer number where his messages are sent. If the person is visiting for a short time, or if he has not been assigned a printer, his messages are automatically held in a special file and can be recalled for display or printing.

In accordance with one embodiment of the system, an advantage of incorporating the message communication system is that installation is simple and rapid. With communication on power lines, installation does not require additional office wiring, leasehold improvements or telephone system changes. Additionally, the system is rapidly learned and has built-in self-training features. Most operators can use the system in minutes and are proficient in less than a day.

TRANSMITTER

Figure 2:
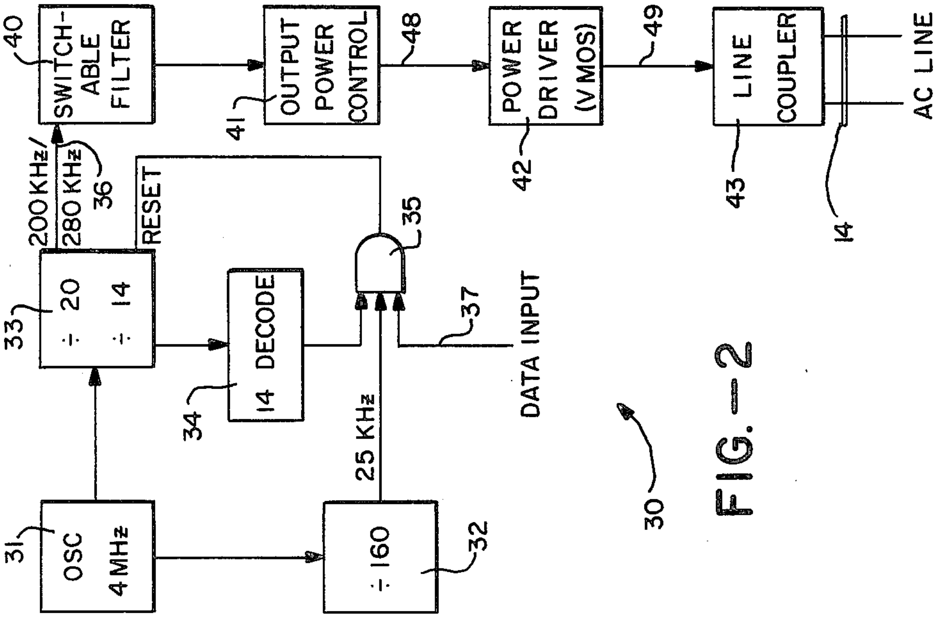
FIG. 2 depicts a block diagram of a message transmitter, which forms a portion of FIG. 1.

Referring now to FIG. 2, a block diagram is depicted of a transmitter 30 for transmitting message information to remote printers 16–19 of FIG. 1. Transmitter 30 could be contained within computer 11 of FIG. 1.

In FIG. 2, oscillator 31 generates a 4 MHz signal for connection to divider circuits 32–33. Divider circuit 32 is a divide by 160 circuit for generating a 25 KHz signal for connection to logical AND gate 35. Divider circuit 33 divides the 4 MHz signal from oscillator 31 by 20 and 14, thereby generating 200 KHz and 280 KHz signals on bus 36.

Divider circuit 33 (which typically includes decade counters) provides through decoder circuit 34 a decode signal for connection to logical AND gate 35 when divider circuit 33 has counted to count "14".

Logical AND gate 35 also receives data input in the form of a message on bus 37, which typically could be ASCII format, techniques which are known in the art.

In FIG. 2, in order to generate a message signal which will correspond to the data input signal on bus 37 (in ASCII format) divider circuit 33 generates two discrete carrier frequencies (200 KHz and 280 KHz) to correspond to the changing binary states of the data input signal on bus 37 (although the system could utilize frequency shift keying techniques to modulate the carrier signal to form composite first and second states representing the modulated message signal).

In a preferred embodiment, a logical "1" is represented by a 280 KHz signal and a logical "0" is represented by a frequency modulated signal varying between 200 KHz and 280 KHz at a 25 KHz rate. The system typically uses ASCII techniques with the input data representing a message in RS232 format, in which a low state of the input data represents a logical "1" and a high state represents a logical "0".

In order to achieve such a message signal, if the data input signal (in RS232 format) is low, divider circuit 33 will generate an unmodulated 280 KHz signal to correspond to the "low" state.

If the data input signal is high, divider circuit 33 divides the 4 MHz signal by 14 for the positive half of the 25 KHz signal and divides the 4 MHz signal to 20 for the negative half of the 25 KHz signal. This continues as long as the data input signal is high.

Accordingly, the carrier signal generated on bus 36 will be a 280 KHz square wave signal corresponding to a logical "1" on input bus 37 and will vary between 200 KHz and 280 KHz at a 25 KHz rate for a logical "0" on bus 37. By utilizing a common 4 MHz signal, it has been found that a phase coherency exists between the carrier signal and the message signal (i.e., the zero crossings of the 25 KHz and 200/280 KHz signals are phase coherent). In one embodiment, this phase coherency provides the system with the capability of utilizing existing power lines in an office complex without the requirement of installing special equipment for transmitting messages.

The modulated carrier signal is connected to switchable filter 40, which receives the squarewave modulated carrier signal and converts it to a sinusoidal frequency modulated signal (with harmonics) below 455 KHz, as required by FCC regulations.

Switchable filter 40 can be viewed as a variable tank circuit responsive to the 200 KHz and varying 200–280 KHz states on bus 36.

The sinusoidal waveform is connected to output power control circuit 41 (typically including a potentiometer) and to VMOS power driver circuit 42 for generating power signals for connection to line coupler circuit 43.

Line coupler circuit 43 typically uses transformer coupling to connect the frequency modulated sinusoidal carrier signal to the antenna or signal distribution lines, such as conventional AC power line 14, in order that the signal may be easily transferred to the desired remote printing location somewhere in the office.

Further details of the transmitter are described in the cross-referenced application entitled "Message Communication System".

RECEIVER

Figure 3:
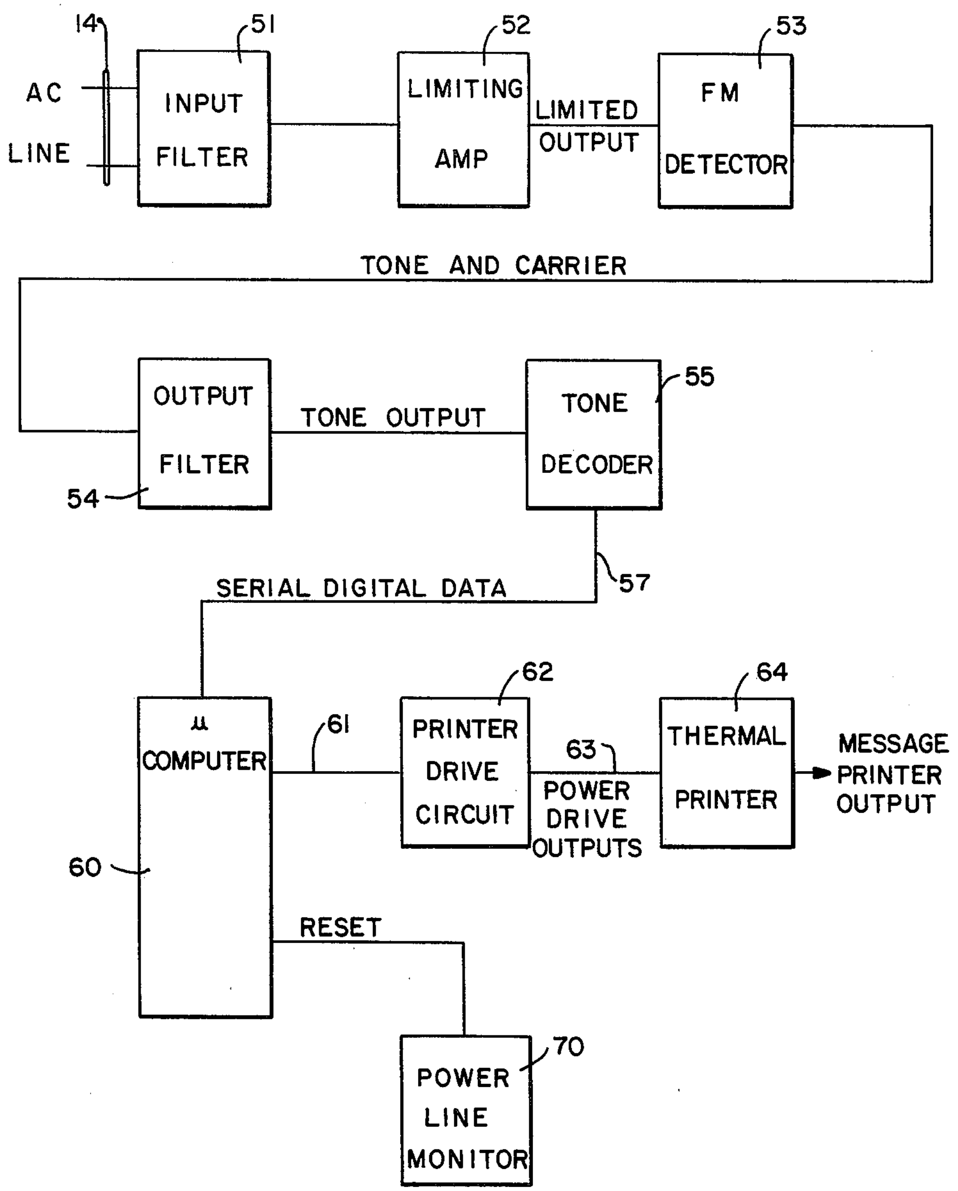
FIG. 3 depicts a block diagram of a message receiver, which forms a portion of FIG. 1.

Referring now to FIG. 3, a block diagram of a receiver for utilization with the communication system is depicted.

In FIG. 3, the transmitted frequency modulated sinusoidal message signal is transmitted on the conductive medium such as AC line 14 to a receiver.

In FIG. 3, the received signal on bus 14 is connected to input filter 51, which typically is a low Q input filter (Q approximately 5) in order to provide an improved signal/noise ratio. Low Q filter 51 solves problems of ringing, which can be the source of false data, and which can occur in the event of extraneous noise, impulses and the like.

The band limited signal from filter 51 is connected to limiting amplifier 52 and FM detector 53 (typically 2111) for generating a tone and carrier signal for connection to output filter 54.

Limiting amplifier 52 generates a squarewave signal corresponding to the sinusoidal input signal, and FM detector 53 is a quadrature slope detector for generating 25 KHz tone corresponding to a logical "0" and where no tone corresponds to a logical "1".

Output filter 54 receives the detected signal and removes the carrier signal from the decoded signal thereby generating a message signal for connection to the tone decoder 55. Tone decoder 55 incorporates phase lock loop techniques in order to generate a serial digital data signal on bus 57.

In one embodiment, tone decoder 55 receives the phase-coherent frequency modulated sinusoidal carrier signal and utilizes improved means for accurately detecting the presence of a message even if transmitted through severe noise and signal loss typical of conventional AC power lines pre-existing in the office complex.

In FIG. 3, the serial digital data signal from decoder 55 is connected to microcomputer or microprocessor 60 via bus 57. As will be described, microprocessor 60 generates appropriate drive control signals on bus 61 which correspond to the message information in the serial digital data signal on bus 57.

The drive control signals on bus 61 are connected to printer drive circuit 62 which in turn generate power drive output signals on bus 63 for connection to thermal printer 64, which, as will be described, is a modification of a thermal printer circuit such as Texas Instruments' fixed head printer.

The message received via power line 14 is then printed in hard copy form by printer 64, thereby informing a user of a message such as in the form of a waiting telephone call.

The power line is monitored by power line monitor 70 and a controlled shut down and start up of microcomputer 60 is provided by monitor 70 at low line conditions.

Figure 4:
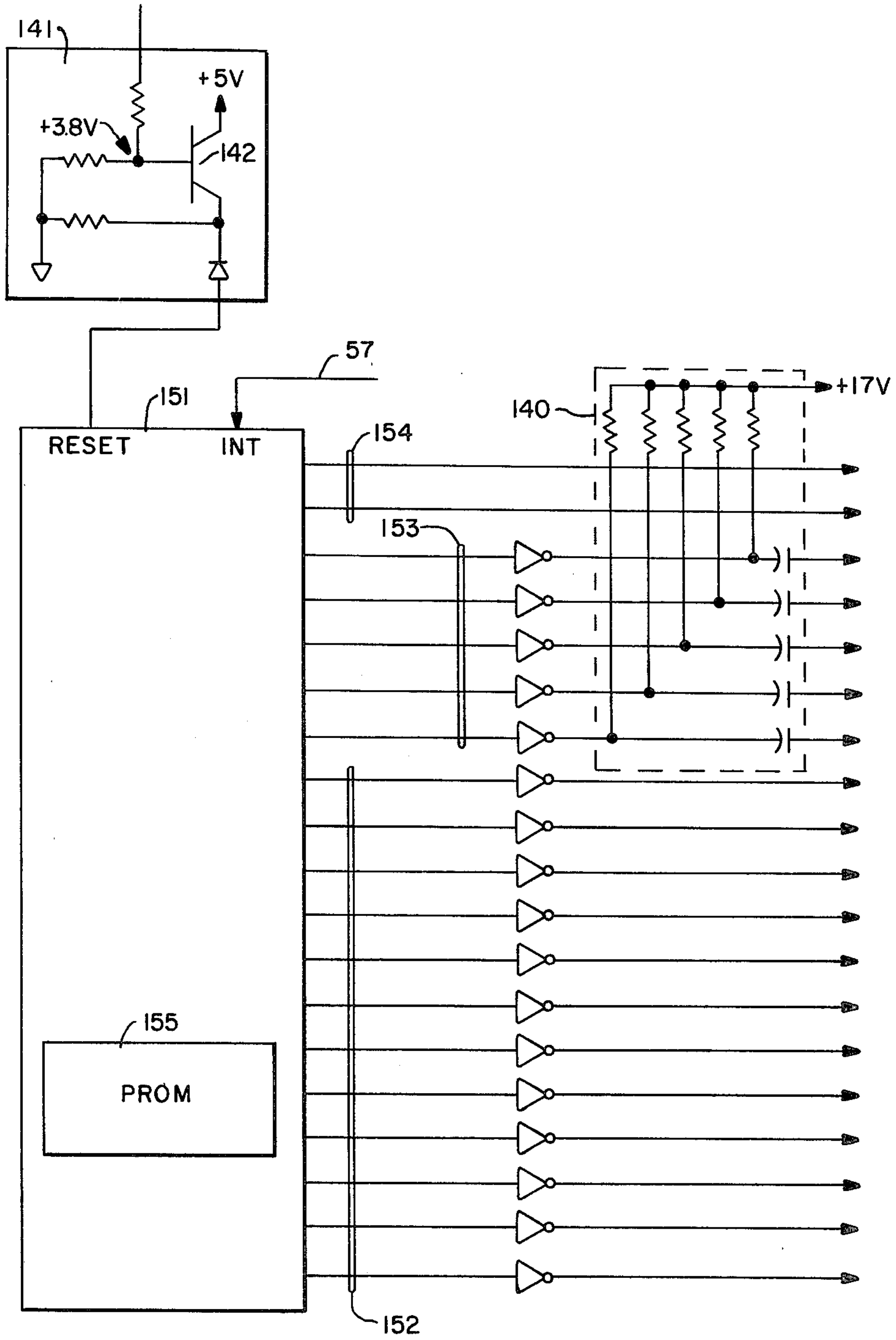
FIG. 4 depicts a schematic diagram of a portion of the receiver of FIG. 3.

Referring now to FIG. 4, a portion of the receiver circuit of FIG. 3 is depicted in schematic detail in which microprocessor 151 (typically Intel's 8035 together with associated peripheral devices) is connected to receive the serial digital data signal on bus 57 from tone decoder 55 of FIG. 3 into the interrupt (INT) pin of processor 151. A program of instructions for controlling the operation of the receiver circuit could be stored in PROM 155 contained within microprocessor 151. A cycle of operation will be described in conjunction with the description for the flow charts depicted in FIGS. 7–11.

Microprocessor or microcontroller 151 looks at the leading edge of the first bit of the digital data stream (typically an ASCII format) to check the format. Microcontroller 151 looks at the bit duration of the first start pulse, and upon proper duration will proceed with checking the digital data stream to determine the appropriate unique address and message contained therein.

In one embodiment, each character printed by the thermal printer 64 of FIG. 3 is represented by a $5\times5$ matrix of dots, although any size matrix ($N\times M$) could be utilized. Thermal printer 64 provides "sideways" printing in a format of 12 characters per column, where each character comprises a $5\times5$ matrix. This provides a wide block of text (e.g., 80 characters) comprised of 12 lines per block, yet is produced with low cost printheads.

Microcontroller 151, upon receiving a valid address signal, sends drive control signals on 12-bit bus 152 to sequentially enable the appropriate column corresponding to thermal printer 64 of FIG. 3.

Microcontroller 151 also sends "dot" enable signals on 5-bit bus 153 which enables the appropriate "dots" for the respective character of the column. The appropriate formatting can be done either at the central processing unit 11 of FIG. 1 or at the microcontroller 151 of FIG. 4.

Motor controls are sent on bus 154 to the thermal printer stepper motor (not shown) in order to properly advance the paper feed through the printer.

Head protection of the thermal printer is provided by circuit 140, since if the microcontroller 151 becomes lost somewhere in its program, the random turning on of a head is avoided by providing capacitive coupling in circuit 140 to insure that the appropriate head driver leads are not kept in an on state.

Power line monitor circuit 141 of FIG. 4 is provided to reset the microcontroller 151 to the beginning of the program in the event that the +5 voltage supply falls to a level less than +4.5 volts when compared in transistor 142. Power line monitor 141 thereby provides for an orderly shut down and restart up of microcontroller 151, which prevents marginal operation of the printer should the voltage level fall below a predetermined level. This insures proper operation of microcontroller 151.

A more detailed sequence of operation of the message receiver 64 will be discussed in conjunction with the flow chart depicted in FIGS. 7–11.

Figure 5:
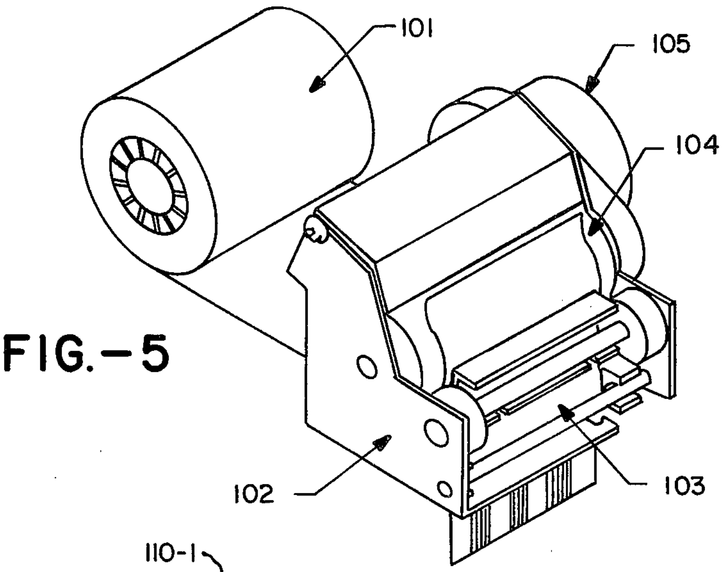
FIG. 5 depicts a block diagram of a thermal printer, which forms a portion of the receiver of FIG. 3.

Referring now to FIG. 5, a diagram of a thermal printhead mechanical interface is depicted, which could be a model such as Texas Instruments' Model No. EPN3112.

In FIG. 5, a roll of thermographic paper 101 is adapted to be in contact with printhead-heat sink assembly 103, which is supported by chassis 102 and roller 104. Control signals are provided to stepping motor 105 via microprocessor 151 of FIG. 4.

A message to be displayed on thermal paper 101 is under control of microprocessor 151 of FIG. 4, which provides necessary control signals to assembly 103. The paper 101 is stepped or moved past assembly 103 by stepping motor 105.

Figure 6:
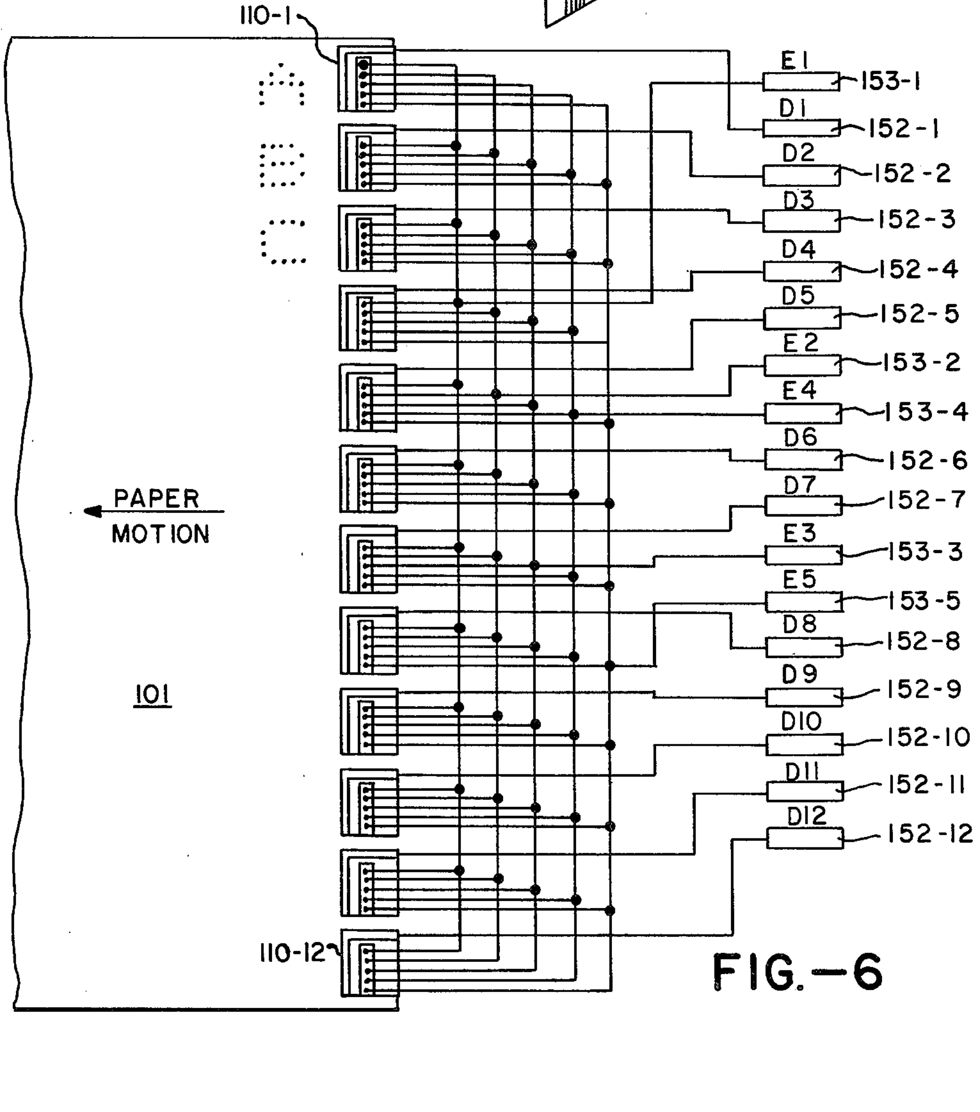
FIG. 6 depicts a diagram of a thermal printhead which forms a portion of the receiver of FIG. 3.

Referring now to FIG. 6, a more detailed diagram of the assembly 103 of FIG. 5 is depicted. In FIG. 6, the printhead control signals from microprocessor 151 on bus 152 are connected to connectors 152-1 through 152-12. Dot element control signals from processor 151 of FIG. 4 are connected to dot element connectors 153-1 through 153-5.

In FIG. 6, the motion of thermal paper 101 past printheads 110 is controlled by control signals on bus 154 from microprocessor 151 to the stepper motor 105 of FIG. 5.

In FIG. 6, each printhead 110-1 through 110-12 corresponds to the capability of printing a character in "sideways" fashion such that a message format can be displayed having, in one embodiment, twelve lines (corresponding to twelve printheads depicted in FIG. 6), where the resolution is determined by the number of rows and columns of each character matrix.

For example, as described previously, one embodiment of the present invention utilizes a 5×5 matrix for each character. As seen in FIG. 6, the letter "A" could be depicted by energizing the appropriate dot elements in each column of the 5×5 matrix representing the character to be printed by printhead 110-1.

Similarly, the characters for the remaining lines to be printed on paper 101 are printed in accordance with the flow chart depicted in FIGS. 7–11.

It can be seen that the operation of the message receiver can provide a wide block of text (e.g., 80 characters), comprised of twelve lines per block, yet is produced with low cost printheads such as depicted in FIG. 6.

Referring now to FIGS. 7–11, there is depicted therein flow charts illustrating the operation of the system.

Figure 7:
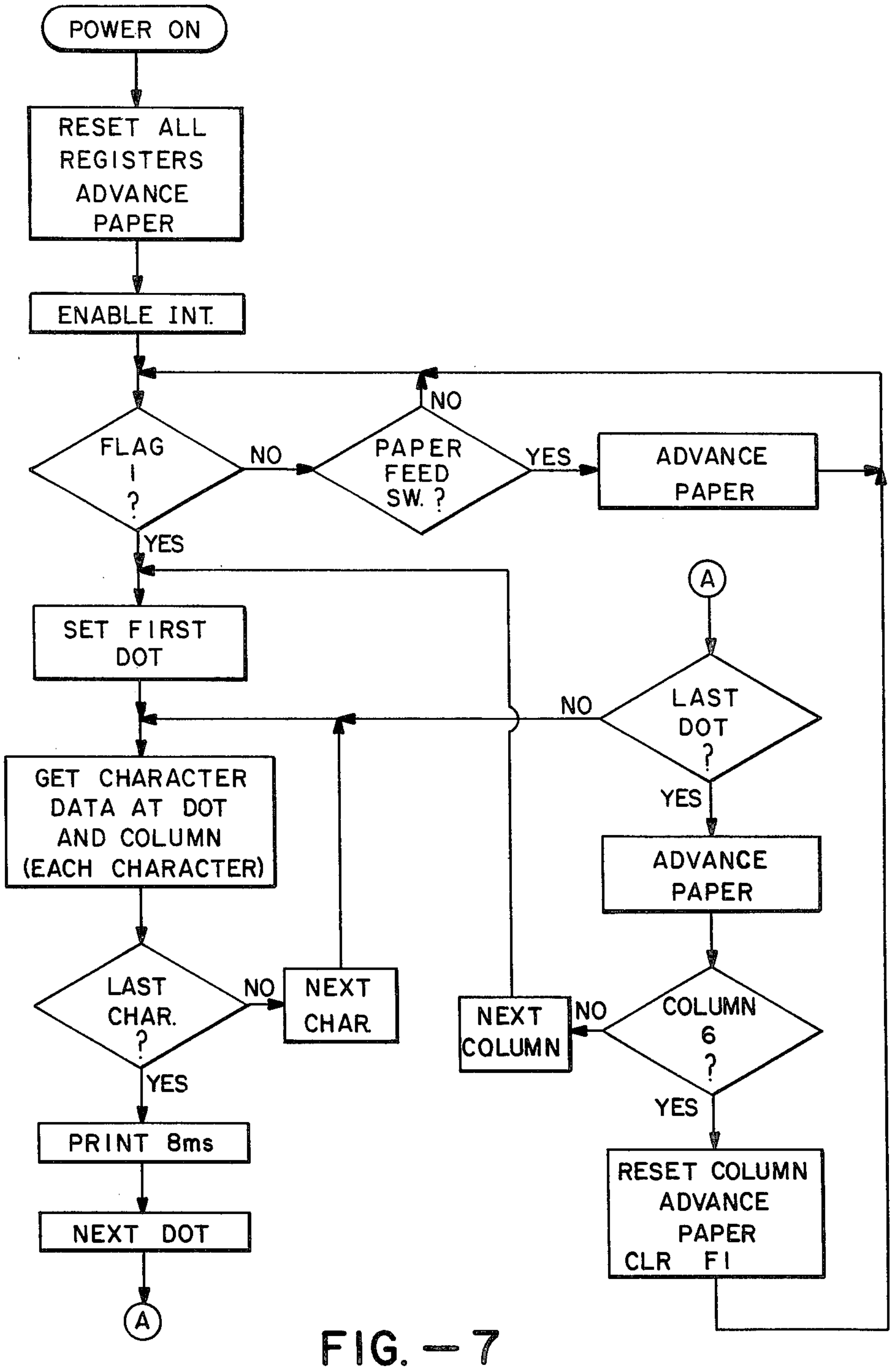
FIGS. 7–11 depict flow charts for describing the operation of the message receiver of FIG. 3.

In FIG. 7, when power is turned on, the microprocessor 151 of FIG. 4 resets its internal registers and flags. Also, microprocessor 151 advances the paper in the printer by generating a control signal for the stepper motor in order to advance one line and synchronizes motor and paper position.

The next step is to enter the enable interrupt loop, in which the system determines whether or not FLAG 1 is set, which is an indication whether data is ready to be printed. If FLAG 1 is not set, a paper feed switch loop is entered to advance paper and return to FLAG 1.

If FLAG 1 is set, the system enters the loop to determine which dots for each column of characters are to be printed. The Set First Dot loop initializes the character generation routine. In one embodiment, since twelve characters per column are printed, the system determines whether the left lowest dot of each 5×5 matrix for each character is to be printed or not. The Set First Dot loop will determine for each character in sequence whether a particular dot of the 5×5 matrix is to be printed. When the system has gone through twelve characters, the Print for 8 ms step will turn on, as required, the appropriate dot for each of the twelve characters.

The system then advances the dot counter and goes to step "A" to determine whether the last dot position has been processed by the program, and if so advances the paper. Since the preferred embodiment utilizes a 5×5 matrix, the column 6 step, when reached, resets the column, advances the paper and clears the F1 flag.

Figure 8:
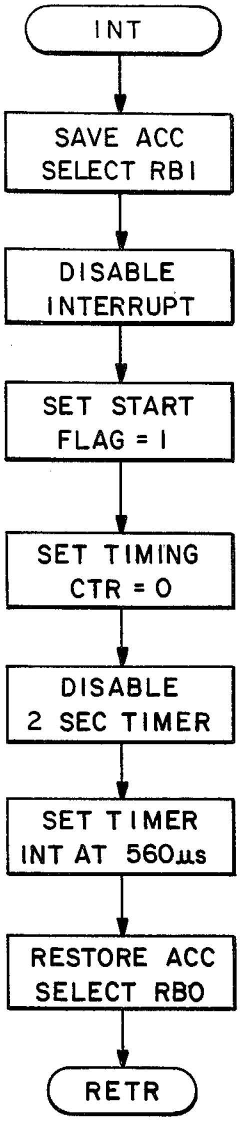

Referring now to FIG. 8, the interrupt (INT) routine is depicted in which the system initially saves the accumulator and selects the desired register bank (in the preferred embodiment there are two internal register banks within microprocessor 151 - RB0 and RB1). The interrupt routine is entered the first time a 0 is detected in the bit stream.

Initially, the system is looking for a valid start bit which is determined as a function of time. The system therefore disables interrupts and looks for a valid start bit.

In ASCII format, the start bit is analyzed by microprocessor 151 during the Set Start Flag=1 routine. To do this, a timing counter (internally) is set to 0 and the system looks at a start pulse.

In order that the system not time out, an internal 2-second timer is disabled (in the event that it had been previously enabled). To check if the start bit is valid, the system will go to the Timer Interrupt routine, which occurs 560 usec later.

Figure 9:
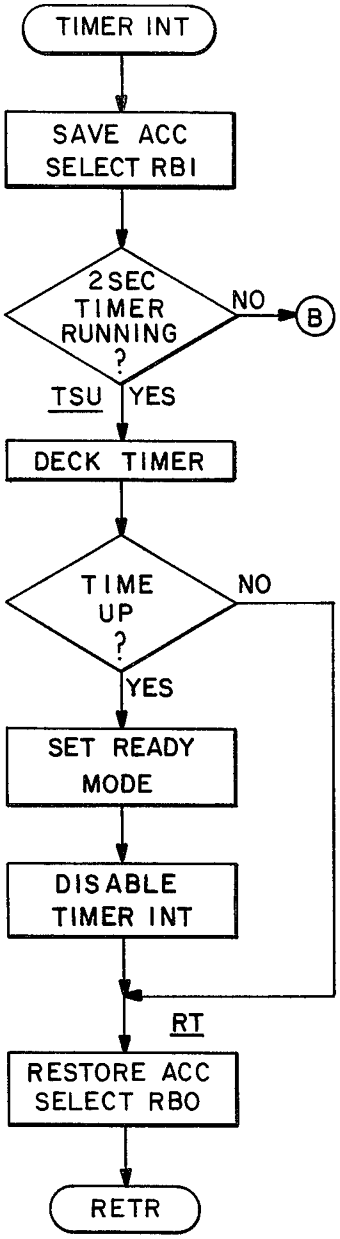

In FIG. 9, the Timer Interrupt routine saves the accumulator and selects register bank 1. If the 2-second timer is not running, the system goes to step "B", depicted in FIG. 10. If the 2-second timer is running, the system will decrement the timer, set the ready mode and disable the timer interrupt when the time is up.

Figure 10:
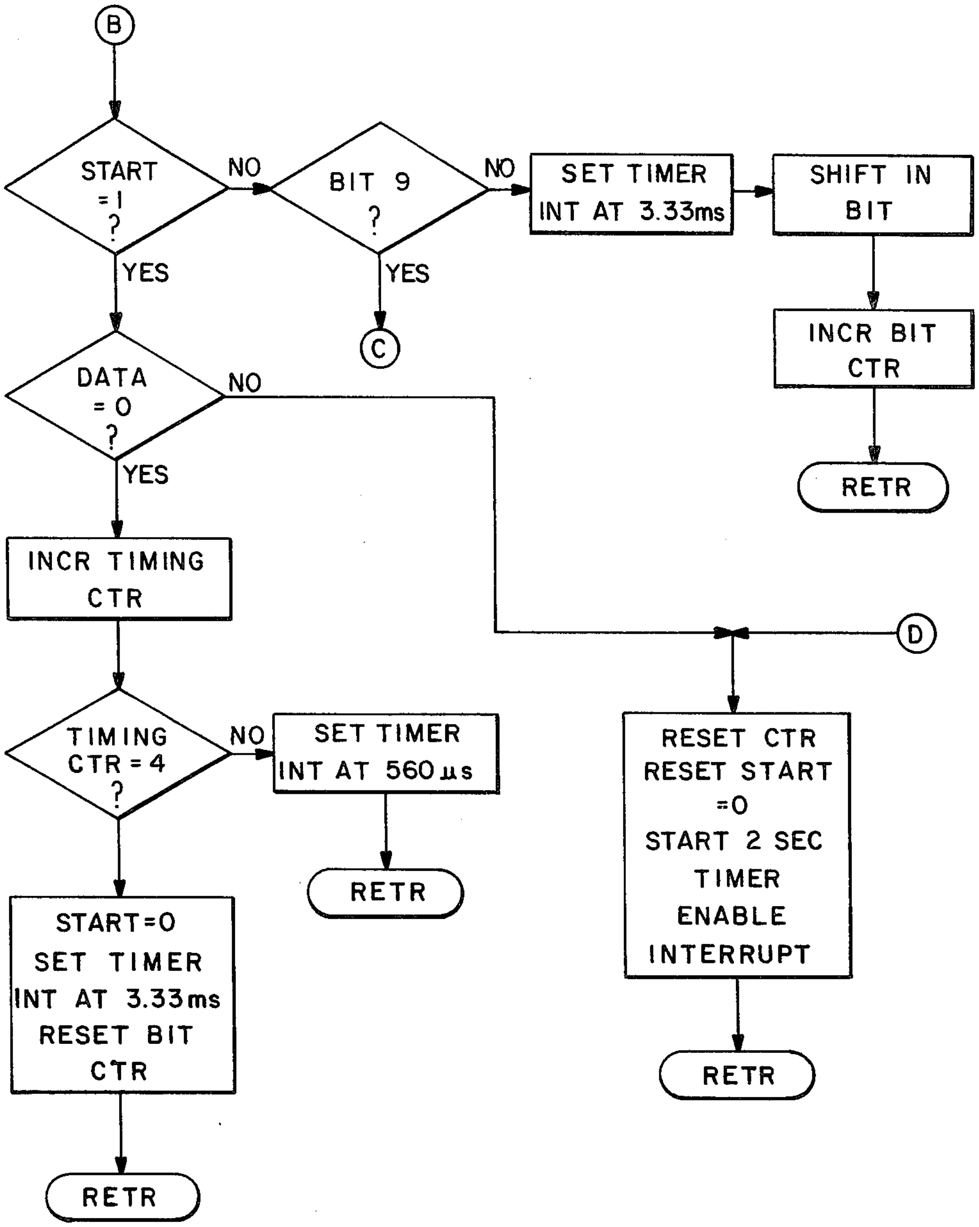

In FIG. 10, the first step in routine B is to determine whether the start bit is being examined. If so, the system examines the data and if not "0", enters routine D, in which counters are reset, start flag is reset to 0, the 2-second timer is started, and the interrupt of FIG. 8 is enabled.

If Data=0, the timing counter is incremented, which in a preferred embodiment will be counting to 4. If the counter reaches 4, the system begins looking for data (Start=0), sets the timing interrupt to 3.33 milliseconds (since in ASCII format, data bits occur every 3.33 ms), and the bit counter is reset.

In routine B, if Start=0, (looking for data), it is determined whether bit 9 has been reached (ASCII format utilizes 8-bit format). If bit 9 has not been reached, the system continues with setting the timer interrupt at 3.33 ms, shifting in bits and incrementing the bit counter.

Figure 11:
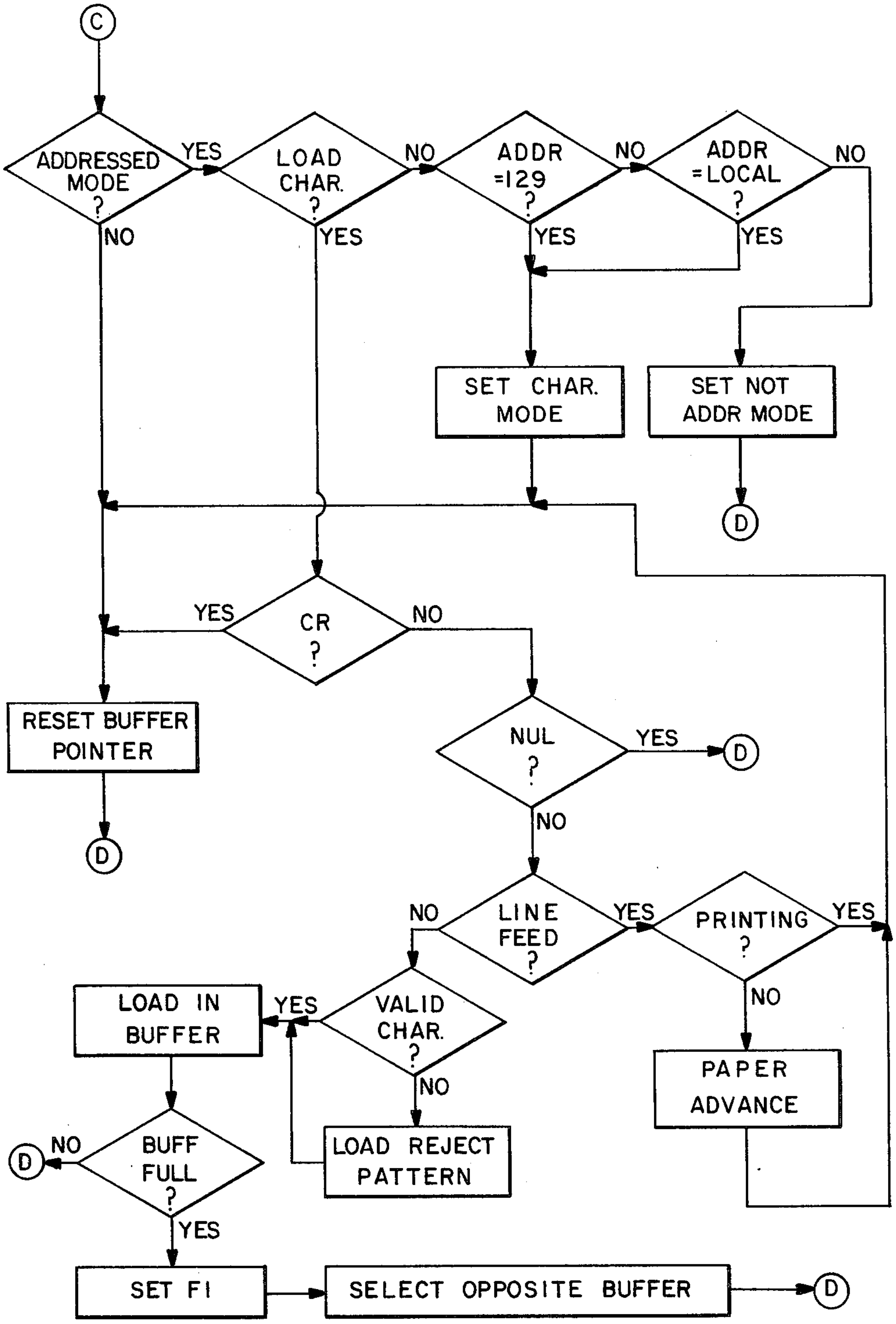

When bit 9 is reached, the system goes to Step C depicted in FIG. 11, in which the Addressed mode is checked to determine if a good address has been received. If so, the load character mode is checked to see if the system is looking for an address or a character. If looking for an address, the routine checks for Address=129 or Address=local (for the switch position contained within the printer). If a valid address is found, the system is set to a mode (character mode) in order to receive characters and exits to loop D.

If a character has been loaded, control characters are first checked. If a control character is not present, the system determines whether a valid character is present.

If no valid character is present, the system prints an asterisk or some other reject character. If a valid character is present, the buffer will be loaded, and when full the system sets the F1 flag bit and selects the opposite register bank. The print routine of FIG. 7 will thus be enabled.

What is claimed is:

1. A message printer for displaying a message on thermally sensitive recording paper comprising thermal printer means for printing a message having a plurality of lines, said message represented by a series of characters on specified ones of said lines where each of said characters is formed by a pattern of dots energized from a matrix of dots having N rows and M columns, said thermal printer means including a first number of fixed printheads arranged to form a column, said first number equal to the number of lines to be printed, each of said fixed printheads having at least 1 by N dot elements, means for stepping said recording paper in a sideways fashion past said fixed printheads, and control means for sequentially enabling selected ones of said fixed heads and said dot elements for each column of each of said characters, thereby displaying said message in a sideways fashion.

2. A printer as in claim 1 wherein said printer means include first head driver means responsive to control signals from said control means for sequentially enabling each of said fixed heads corresponding to each of said characters to be printed and second head driver means responsive to control signals from said control means for selectively enabling specified ones of said dot elements for each of said columns corresponding to said pattern of dots thereby representing said series of characters for said specified ones of said lines.

3. A printer as in claim 2 wherein said second head driver means are connected in common to said dot elements.

4. A printer as in claim 1 wherein said control means include microprocessor means, said microprocessor means including memory means for storing a program of instructions for controlling the operation of said message printer.

5. A printer as in claim 4 wherein said thermal printer means operates at a predetermined power level and including means for monitoring said power level and for controlling the proper operation of said microprocessor means.

6. A printer as in claim 5 including means for capacitively coupling said control signals to said fixed printheads.

7. A message printer for displaying a message on thermally sensitive recording paper comprising thermal printer means for printing a message having a plurality of lines, said message represented by a series of characters on specified ones of said lines where each of said characters is formed by a pattern of dots energized from a matrix of dots having N rows and M columns, said thermal printer means including a first number of fixed printheads arranged to form a column, said first number equal to the number of lines to be printed, each of said fixed printheads having at least 1 by N dot elements connected in common, means for stepping said recording paper in a sideways fashion past said fixed printheads, microprocessor means for sequentially enabling selected ones of said fixed heads and said dot elements for each column of each of said characters, thereby displaying said message in a sideways fashion, said microprocessor means including memory means for storing a program of instructions for controlling the operation of said message printer.

8. A message printer for displaying a message on thermally sensitive recording paper comprising thermal printer means for printing a message having a plurality of lines, said message represented by a series of characters on specified ones of said lines where each of said characters is formed by a pattern of dots energized from a matrix of dots having N rows and M columns, said thermal printer means including a first number of fixed printheads arranged to form a column, said first number equal to the number of lines to be printed, each of said fixed printheads having at least 1 by N dot elements connected in common, means for stepping said recording paper in a sideways fashion past said fixed printheads, microprocessor means for sequentially enabling selected ones of said fixed heads and said dot elements for each column of each of said characters, thereby displaying said message in a sideways fashion, said microprocessor means including memory means for storing a program of instructions for controlling the operation of said message printer and means for capacitively coupling said control signals to said fixed printheads.

* * * * *